United States Patent [19]
Jachmann

[11] 3,980,408
[45] Sept. 14, 1976

[54] CONSTRUCTION ELEMENT

[76] Inventor: Rolf D. Jachmann, 3161 Hulptingsen 16, Germany

[22] Filed: Apr. 29, 1975

[21] Appl. No.: 572,712

[30] Foreign Application Priority Data
Apr. 30, 1975 Germany............................ 2420864

[52] U.S. Cl.................................. 403/19; 403/171; 403/362
[51] Int. Cl.² ........................................... F16B 7/00
[58] Field of Search .......... 403/295, 171, 172, 176, 403/362, 170, 19

[56] References Cited
UNITED STATES PATENTS

| | | | |
|---|---|---|---|
| 2,691,538 | 10/1954 | Clausen ........................ | 403/362 X |
| 3,632,147 | 1/1972 | Finger ............................. | 403/176 |
| 3,864,051 | 2/1975 | Reid ............................... | 403/171 X |

FOREIGN PATENTS OR APPLICATIONS

| | | | |
|---|---|---|---|
| 1,489,468 | 6/1967 | France ............................. | 403/171 |
| 334,235 | 1/1959 | Switzerland ...................... | 403/171 |

*Primary Examiner*—Andrew V. Kundrat
*Attorney, Agent, or Firm*—Norman S. Blodgett; Gerry A. Blodgett

[57] ABSTRACT

Construction element having a threaded portion for connection to a post and a spool-shaped portion for connection to a tube.

4 Claims, 2 Drawing Figures

CONSTRUCTION ELEMENT

BACKGROUND OF THE INVENTION

It is common practice to use a junction piece for releasably connecting rod-shaped structural elements such as are used in different types of construction for the assembly of frames and shelves in the interiors of buildings and also for exterior structures. One known form of such junction pieces consists of a junction ball with a pin element extending radially of the ball surface; these junction pieces are inserted into recesses in the front ends of rod-like structural elements and can be fixed axially thereof. These junction pieces permit the pin elements to be arranged at any desired angle relative to one another. Difficulties arise in axially securing the pin elements in the front end recesses of the rod-shaped structural elements (which are usually cylindrical tubes), especially when the connection must be free of play in all directions as is required, for example, for use in the interior construction in a building. These and other difficulties experienced with the prior art devices have been obviated in a novel manner by the present invention. It is, therefore, an outstanding object of the invention to provide a construction element that is completely free of play in the connection between the junction ball and the rod-shaped structural elements without requiring a large manufacturing outlay or the expense of machining or fitting the recesses in the structural elements.

With this and other objects in view, as will be apparent to those skilled in the art, the invention resides in the combination of parts set forth in the specification and covered by the claims appended hereto.

SUMMARY OF THE INVENTION

In general, the objects of the invention are solved by a construction element consisting of a cylindrical bolt which has like a dumb-bell, an annular circumferential groove with a trapeziform cross-section, having an inclined surface farthest from the junction ball against which inclined surface the end 7a of a radial fastening screw extending from the outside and accommodated in the wall of the recess of the cylindrical rodlike structural element is movable.

The present construction allows the pin element, which forms a bracket on the junction ball and is inserted in the rod-shaped structural element, to be incorporated with the ball in the recess as long as the end of the fastening screw moves against the said inclined part of the annular circumferential groove. The pin element also allows a very simple mass-production if, as the invention further provides, they have at least one end facing a screw-threaded projection, and the junction ball requires (apart from a threaded bore), no additional preparation.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
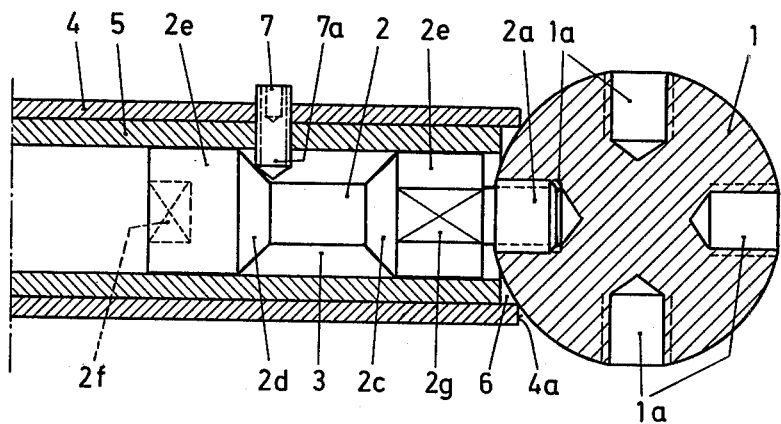
FIG. 1 is a cross-sectional view of the construction element, the junction piece in section.
Figure 2:
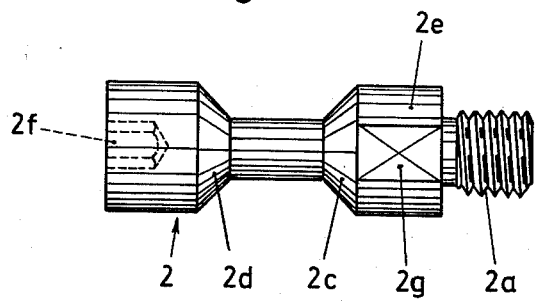
FIG. 2 is a front elevational view of a portion of the element on a larger scale.

The junction ball 1 has threaded bores 1a and in one of these bores is threadedly connected a pin element in the form of a cylindrical bolt 2 having a threaded projection 2a at one end face. The cylindrical bolt also has an annular circumferential groove 3 with a trapeziform cross-section having end portions 2e and 2f with two oppositely-inclined walls 2c and 2d of truncated conical form separated by a cylindrical portion. A cylindrical, rod-shaped, structural element 4 is pushed onto the cylindrical bolt 2. In the end of the element 4 is inserted and cemented an annular casing which defines an annular recess 6 with the annular face 4a of the structural element. The outer cylindrical section of the bolt 2 (see also FIG. 2) is slidingly guided in the casing 5. In the walls of the rod-shaped structural element 4 and of the casing 5 resides a fastening screw 7 with its end 7a projecting into the casing 4 so that it abuts the inclined wall 2d most distant from the junction ball. On tightening the screw, the junction ball 1 is pulled into the facing opening (formed by the annular recess 6 of the rod-shaped structural element 4) until it lies tightly against the adjacent annular edges and so produces a connection between the rod and ball which is free of play.

The end face of the cylindrical bolt 2 away from the junction ball 1 is provided with a multi-sided recess for a socket wrench. A corresponding flattening 2g of the circumference can be provided for a wrench.

It is obvious that minor changes may be made in the form and construction of the invention without departing from the material spirit thereof. It is not, however, desired to confine the invention to the exact form herein shown and described, but is desired to include all such as properly come within the scope claimed.

The invention having been thus described, what is claimed as new and desired to secure by Letters Patent is:

1. Construction element for releasing connecting rod-shaped structural elements, comprising a junction ball and a pin element extending radially from the ball surface and insertable and fixable in the end-face recess of a rod-shaped structural element,
    characterized by the fact that
    the pin element comprises a cylindrical bolt (2) which has, like a dumb-bell, an annular circumferential groove (3) with a trapeziform cross-section, with the end 7a of a radical fastening screw (7), extending from the outside and accommodated in the wall of the recess of the cylindrical rod-like structural element (4), engageable with the inclined wall most distant from the junction ball (1), the pin elements having on at least one end face a screw-threaded projection (2a) engageable with a threaded hole (a) in the junction ball (1), the pin element having at one end face a multi-sided recess for a socket wrench, and at least one of the cylindrical sections (2e, 2f) of the cylindrical bolts (2) on either side of the annular circumferential groove (3) having flats for receiving a wrench.

2. Construction element as recited in claim 1,
    characterized by the fact that
    the end-face recess of the rod-shaped structural element (4) has an annular insert.

3. Construction element as recited in claim 2,
    characterized by the fact that
    the annular insert is constructed as an inserted annular casing (5) in the rod-shaped structural element (4).

4. Construction element as recited in claim 3,
    characterized by the fact that
    the annular casing (5) is cemented into the rod-shaped structural element (4).

* * * * *